United States Patent [19]

Jones

[11] Patent Number: 5,675,778
[45] Date of Patent: Oct. 7, 1997

[54] METHOD AND APPARATUS FOR AUDIO EDITING INCORPORATING VISUAL COMPARISON

[75] Inventor: Cameron Jones, Falmouth, Mass.

[73] Assignee: Fostex Corporation of America, Norwalk, Calif.

[21] Appl. No.: 337,163

[22] Filed: Nov. 9, 1994

Related U.S. Application Data

[63] Continuation-in-part of Ser. No. 131,996, Oct. 4, 1993, abandoned.

[51] Int. Cl.$^6$ .................................................. G06F 17/30
[52] U.S. Cl. ............................ 395/601; 395/615; 369/83
[58] Field of Search .................................. 395/600, 800, 395/601, 616, 615; 84/603; 369/25, 83; 381/48

[56] References Cited

U.S. PATENT DOCUMENTS

| | | | |
|---|---|---|---|
| 2,416,353 | 2/1947 | Shipman et al. | 35/1 |
| 3,634,759 | 1/1972 | Koshikawa et al. | 324/76.22 |
| 3,723,652 | 3/1973 | Alles et al. | 395/2.85 |
| 4,276,445 | 6/1981 | Harbeson | 395/2.16 |
| 4,375,083 | 2/1983 | Maxemchuk | 395/2.87 |
| 4,378,466 | 3/1983 | Esser | 345/22 |
| 4,409,682 | 10/1983 | Mori et al. | 369/3 |
| 4,449,190 | 5/1984 | Flannagan et al. | 364/513.5 |
| 4,601,052 | 7/1986 | Saito et al. | 395/2.74 |
| 4,612,569 | 9/1986 | Ichinose | 348/588 |
| 4,627,001 | 12/1986 | Stapleford et al. | 395/2.69 |
| 4,641,343 | 2/1987 | Holland et al. | 395/2.85 |
| 4,757,540 | 7/1988 | Davis | 395/2.87 |
| 4,779,209 | 10/1988 | Stapleford ett al. | 364/513.5 |
| 4,945,566 | 7/1990 | Mergel et al. | 395/2.62 |
| 4,969,194 | 11/1990 | Ezawa et al. | 395/2.85 |
| 5,048,390 | 9/1991 | Adachi et al. | 84/464 R |
| 5,051,845 | 9/1991 | Gardner et al. | 386/52 |
| 5,204,969 | 4/1993 | Capps et al. | 395/800 |
| 5,220,611 | 6/1993 | Nakamura et al. | 395/2.87 |
| 5,265,075 | 11/1993 | Bergeron et al. | 369/25 |
| 5,371,315 | 12/1994 | Hanzawa et al. | 84/603 |
| 5,481,645 | 1/1996 | Bertino et al. | 395/2.79 |

OTHER PUBLICATIONS

Appendix "A" Copy of a Musician's Guide to the Sample–To–Disk System Chapters 1–5, Preliminary Version (Revised Dec. 27, 1982).

*Primary Examiner*—Thomas G. Black
*Assistant Examiner*—Greta L. Robinson
*Attorney, Agent, or Firm*—Sherman & Sherman; Kenneth L. Sherman, Esq.

[57] ABSTRACT

A method and apparatus for storing and retrieving visual representations of audio in real-time. The system generates a plurality of sets of waveform display data from a digital audio signal and stores the display data in addition to the audio signal. In the preferred embodiment, each set of waveform display data describes a different time scale representation of the audio signal. The system can edit and playback the audio signal from the visual presentations described by the waveform display data sets. The system implements a file management system to relate each set of data describing the visual representations and the audio signal.

21 Claims, 7 Drawing Sheets

METHOD AND APPARATUS FOR AUDIO EDITING INCORPORATING VISUAL COMPARISON

RELATED APPLICATION

This application is a continuation-in-part of application U.S. Ser. No. 08/131,996 filed Oct. 4, 1993 for "Digital Audio Record File Management System and Method for the Storage and Retrieval of a Plurality of Related Data Sets" now abandoned.

FIELD OF THE INVENTION

The present invention relates generally to audio editing and in particular to an improved apparatus and method for audio editing assisted by the visual comparison of audio waveforms.

BACKGROUND OF THE INVENTION

Audio, or sound, may be stored on a variety of media for later playback. The stored audio information may be altered to enhance the playback for various purposes. Enhancement may include editing, mixing, etc.

Audio editing techniques are well-known. For example, in analog audio editing, sections of a tape which hold a recorded analog signal are simply "cut" and then "spliced" together.

In digital audio editing, an audio signal is recorded into a computer system by "sampling." A digital processor then assembles the desired audio output by properly sequencing selected audio segments which have been sampled.

During the production of soundtracks for feature films and radio and television programs, it is a common practice to record several performances of a particular scene. Individual phrases, words, or even parts of a word are then chosen from different performances and these phrases and words are "spliced" together to make the final soundtrack.

The selection of the desired phrase or word from a particular performance is a tedious process. Each of the performances must be carefully reviewed and the desired phrases or words must be identified. Then either analog or digital audio editing techniques must be used to extract the desired phrase or word from each performance and chain them together to produce the final soundtrack. Small errors in the selection of individual phrases and words, or the timing and placement of those sound events on the overall soundtrack can result in an unacceptable soundtrack and the entire process must be repeated.

Visual comparison can expedite the selection of phrases and words during audio editing. U.S. Pat. No. 2,416,353 to B. Shipman et al. teaches a means through which audio signals may be visually compared. Shipman's apparatus operates on analog signals and is quite limited. Waveform displays cannot be stored and recalled separately from the actual sound itself. Additionally, the visual display of Shipman's apparatus can only be seen while the sound is being heard. Shipman's apparatus is further limited in that only one time scale representation can be presented to the user at any one time.

As discussed above, digital methods are used to store an audio signal in a computer system via a process called "sampling". The process of sampling is well known. In simple terms, sampling is performed by measuring an audio signal 48,000 times per second using an analog-to-digital converter. Each measurement is stored in a digital computer system in the form of a 16-bit binary number whose value lies between −32,768 and +32,767 inclusive.

Sampling an audio signal in this way creates a large amount of data in a very short amount of time. Approximately 1 megabyte of computer data is generated for each 10 seconds of digital audio data.

Waveform displays could be constructed from the stored digital audio data by searching through the stored digital audio data, measuring the "peak" of each audio wave cycle, and then presenting this peak value on a visual display terminal. Waveform displays constructed from digital audio data in this manner draw very slowly on the screen because a great quantity of digital audio data must be processed in the computer system to generate a single waveform display. This is especially the case where the time scale of the waveform display covers a long phrase or several sentences.

U.S. Pat. No. 5,048,390 to Adachi et al. describes a Tone Visualizing Apparatus. Adachi includes an image memory, an envelope detecting means, a display means and a display control means. Additionally, New England Digital Corporation of New Hampshire manufactured and sold a disk-based recording product in 1982 called their "Sample-to-Disk" System which also shows a tone visualizing apparatus comprising an image memory, an envelope detecting means, a display means and a display control means. The images created in such apparatus simply consist of vertical line segments of varying length spaced equally across the screen to produce "Envelope Displays."

OBJECTS OF THE INVENTION

It is therefore an object of the present invention to provide an improved method and apparatus for audio editing incorporating the ability to quickly visually compare audio waveforms.

Another object of the present invention is to provide a method and apparatus for audio editing that can store and recall audio waveform displays independently from audio data.

Another object of the present invention is to provide a method and apparatus for audio editing that can present waveform displays to the user without the need to hear the sound while the waveform display is being created.

Another object of the present invention is to provide a method and apparatus for audio editing that can quickly present an audio waveform display in any one of several time scales.

Another object of the present invention is to provide a method and apparatus for audio editing that can quickly present an audio waveform display with a long time scale without searching through digital audio data.

SUMMARY OF THE INVENTION

These and other objects of the present invention are achieved by a method and an apparatus for editing audio data where several visual representations of audio waveforms can be visually represented and compared together in real-time. In the present invention, audio waveform representations may be dynamically generated and stored along with the digital audio data in memory.

The waveform representations along with the corresponding digital audio data are stored as a plurality of sets of related data. Each of the sets of related data may then be recalled for editing in a visually understandable time frame. The waveform representations may be visually displayed without the need to hear the sound while the waveform display is being created. The waveforms can be displayed in any one of several time scales.

The preferred embodiment of the present invention uses a microphone, an analog-to-digital converter, a plurality of waveform display generators, a computer interface bus, a program memory, a data memory, a digital processor, a storage device and an audio editing software module.

The audio editing software module directs the operation of the computer system and causes the computer system to simultaneously store a plurality of audio waveform displays as the digital audio data itself is recorded. The audio editing software module additionally includes the capability to direct the computer system to reproduce a desired soundtrack by chaining together small selected segments of digital audio data. The waveform displays can be recalled and presented to the user independently from the digital audio data.

Figure 9:
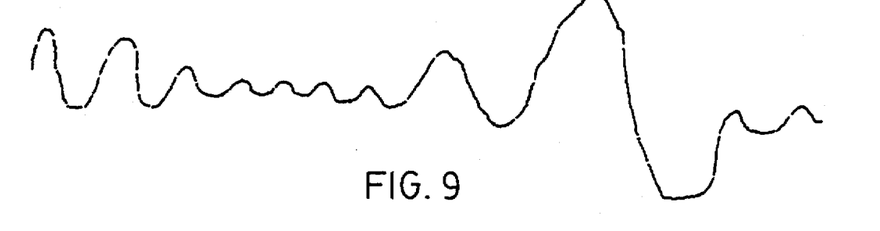
FIG. 9 is a representation of a waveform display showing a portion of the waveform display shown in FIG. 12 yet having a time-scale of 1/50th of a second.

The presently claimed invention also recognizes that digital audio data can be effectively presented on a computer screen in several different ways. Short segments of digital audio consisting of 1000 samples or less (shorter than 1/50th of a second) can simply be plotted on the computer screen as shown in FIG. 9.

Figure 10:
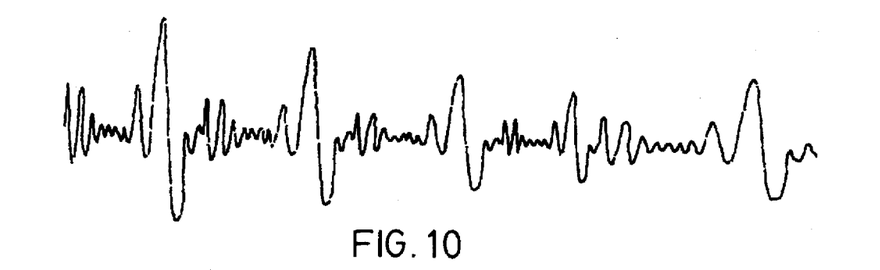
FIG. 10 is a representation of a waveform display showing a portion of the waveform display shown in FIG. 12.
Figure 11:
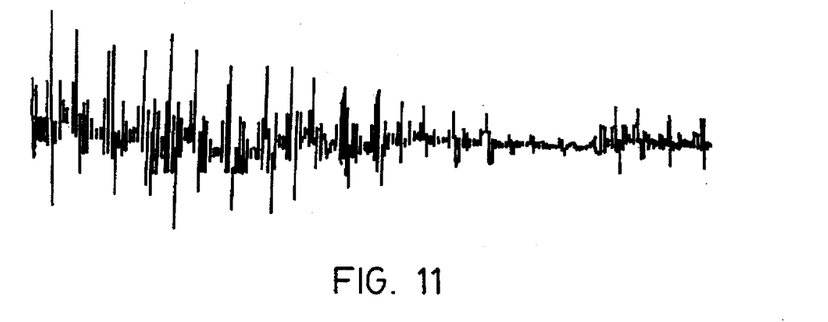
FIG. 11 is a representation of a waveform display showing a portion of the waveform display shown in FIG. 12.
Figure 12:
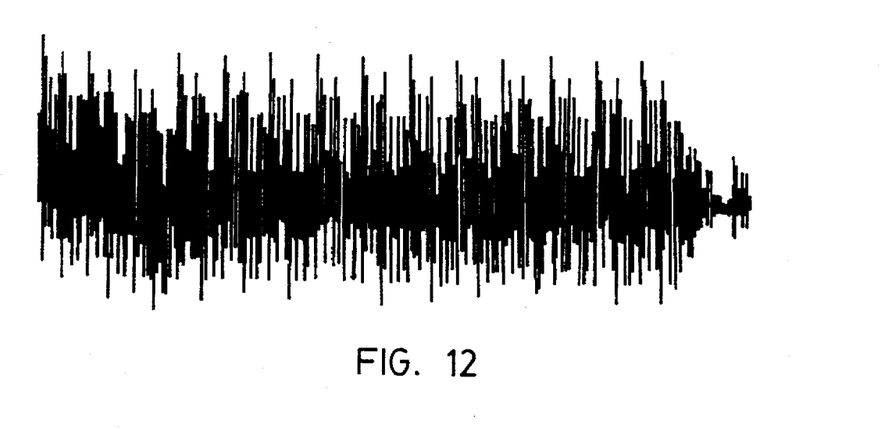
FIG. 12 is a representation of a waveform display of a digital audio signal having a time-scale of approximately 3 seconds.

As longer and longer segments of audio are plotted on the same-size computer screen, the computer image evolves into a series of vertical lines (FIGS. 10–11). A careful study of all the figures will reveal that each figure is in fact a series of vertical lines. The placement of the vertical lines yields the resulting figure. The vertical lines are more apparent and obvious as more and more audio data is plotted (FIG. 12).

The present invention further recognizes that when the amount of audio data shown in a particular display reaches a certain level, it is more efficient to store a description of the display in the computer system by storing a description of each vertical line instead of drawing the visual representation from the actual digital audio data itself.

A single vertical line can be described by two 8-bit numbers—one byte indicating the position of the lower end of the line and the other byte indicating the position of the upper end of the vertical line. Each of FIGS. 9–12 consists of approximately 500 vertical lines.

The present invention recognizes that storing this waveform display data yields a data compression factor that can be significant. For example, FIG. 12 is a visual presentation of approximately 3 seconds of digital audio data. The amount of computer storage required to store the actual digital audio data is 288,000 bytes of computer data (3 seconds times 48,000 samples per second times 2 bytes per sample). The waveform display itself, however, could be stored in as few as 1,000 bytes (500 vertical lines times 2 bytes per line). This achieves a data compression factor of over 100 to 1.

The visual display shown above in FIG. 12 can be reproduced precisely from the 1,000 bytes of compressed data. A visual display created from the compressed data would be indistinguishable from a visual display created by plotting all 144,000 raw digital audio samples.

Compressing the visual display data in this way provides many benefits for the user. The primary benefit is the ability to almost instantaneously show a desired visual presentation on the computer screen by reading and processing only 1,000 bytes of computer data from disk storage instead of reading and processing 288,000 bytes of computer data from disk storage. This increased speed of presentation makes it practical to present several displays at once which in turn simplifies the process of audio editing.

The preferred embodiment of the present invention further uses a file management system to store and manage the separately created images of the sampled music which correspond to each other. The preferred file management system comprises a program memory, a data memory, a digital processor, a large capacity peripheral storage device, a computer interface bus, and a file management control module.

In the preferred embodiment of the present invention the file management system uses: the above-discussed input device for providing streams of digitally coded information, the storage device which accepts and stores user data describing the streams of digitally coded information, and a file management control means for establishing a plurality of data structures on the storage device.

The data structures are geographically segregated areas on the storage device which holds specific types of system data or user data. The user data describes the stream of information and the system data describes the system organization. One segregated area is further divided to arrange the digitally coded user data information into individually accessible groups of related sets of data.

In the preferred file management system, the data structures include a file content area, a volume descriptor, a free data block list, and a file descriptor list. The file content area is divided into a plurality of file data areas. Each file data area contains a plurality of file data blocks, and each file data block stores a single fractional piece of user data from one of the related sets of data. The volume descriptor structure holds system data identifying specific regions of the storage device where other system data and the user data are stored. The free data block list structure holds system data that provides a lookup table of the file data blocks currently available for storing additional user data. The file descriptor list structure holds system data that provides an index to any of the file data blocks currently holding user data.

The preferred file management system of the present invention is used to record and playback digitally encoded audio signals and information describing those signals. Each file describes an audio signal and may be thought to correspond to a single "track" of audio information on analog recording tape. Each related data set in any file describes a single characteristic of the audio signal recorded into the file. For instance, the preferred embodiment creates one related data set having a digital representation of the sound of the audio signal and a further related data set describing each visual waveform characteristic or envelope of that sound. The several characteristics are related and are organized to correspond to each other.

In the preferred file management system, each file data area is set to contain the same number of file data blocks which are placed in sequential order therein. The file data block at a particular sequential location within one file data area is associated with the file data block in an identical location in the sequential order in every other file data area. For instance, the preferred embodiment stores the related data set having a digital representation of the sound of the audio signal in one or more file data blocks within one file data area. The preferred embodiment stores the related data set describing the visual waveform characteristics or envelope of that same sound in file data blocks within a second file data area, choosing the same sequential ordering of file data blocks within both data areas. Thus, information describing the sound of the audio signal will correspond in location to the information describing the envelope representation of that same sound.

The preferred embodiment applies a method for recording the audio information, which includes:

(a) converting the sound signal into an electronic audio signal;

(b) choosing a sampling rate for sampling the audio signal;

(c) sampling the audio signal at the sampling rate;

(d) creating a plurality of sets of related data, each set of data describing one of a plurality of different characteristics of the audio signal; and (e) storing the plurality of related sets of data in different areas upon the storage device.

In the preferred embodiment, each of the related sets of data describe the digital audio sound characteristics, or a visual characterization of that digital audio in a specific time scale. As discussed above each piece of data within any related set of data within the plurality of related sets of data corresponds to all other pieces of data having an identical sequential location within the plurality of related sets of data.

The preferred embodiment uses special methods to initialize the external storage device, to create and organize the data stored on the storage device, and to communicate information to and from the storage device. These methods and the file management system of the preferred embodiment allow the overwhelming amount of data created and used by the system to describe the multitude of different characteristics of the audio signals which are recorded, to be accessed and utilized in real time.

BRIEF DESCRIPTION OF THE DRAWINGS

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DETAILED DESCRIPTION OF THE PREFERRED EMBODIMENTS

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Figure 1:
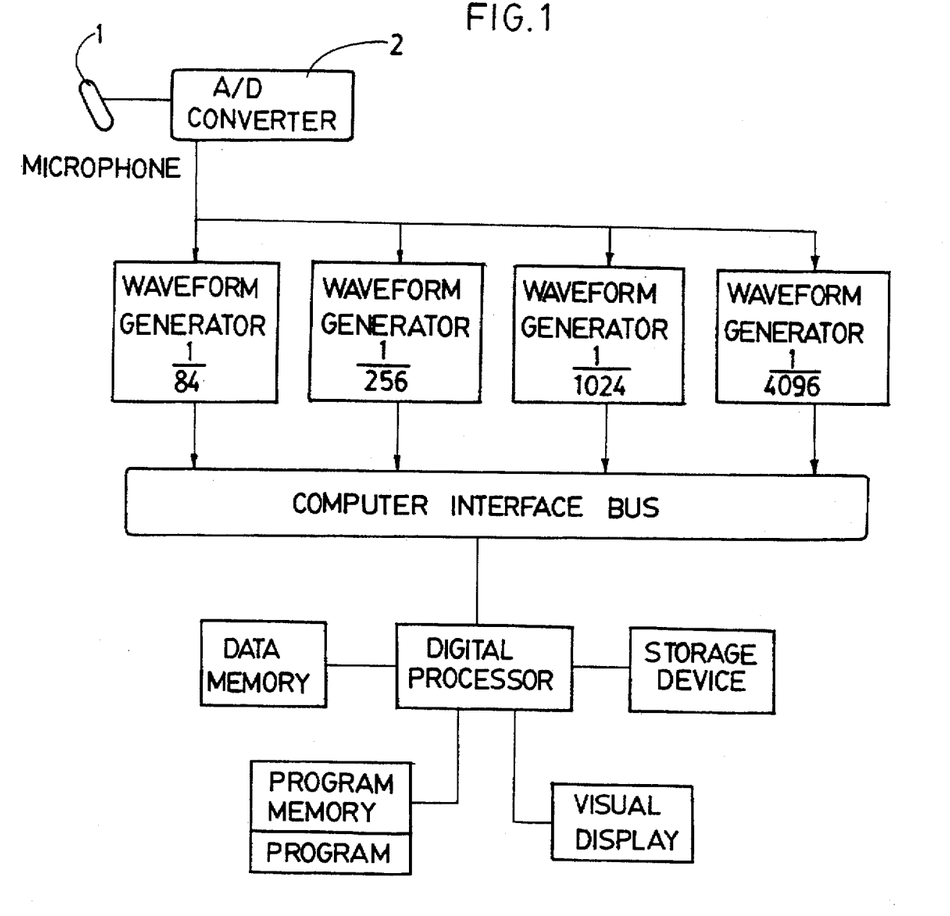
FIG. 1 shows a block diagram of the preferred embodiment of the present invention.

Referring to the depiction of the preferred embodiment of the invention shown in FIG. 1, a microphone 1 converts sound into an analog electrical signal which is fed to an analog-to-digital converter 2. The output of analog-to-digital converter 2 is simultaneously fed to computer interface bus 4 and a plurality of waveform display generators 3.

Computer interface bus 4 is connected to digital processor 5. Attached to digital processor 5 are data memory 6, program memory 7, storage device 9, and visual display terminal 10. Program memory 7 holds an audio editing program module 8 which directs the operation of digital processor 5.

I. Generating And Storing Multiple Waveforms

Figure 2:
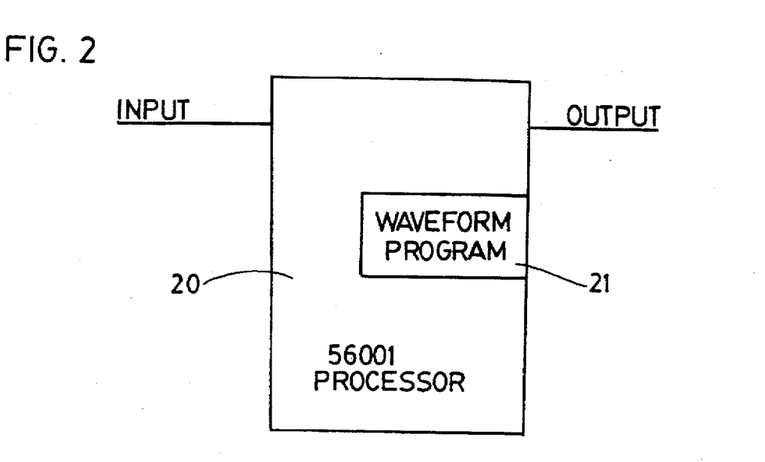
FIG. 2 shows a block diagram of a digital waveform display generator of the present invention.

FIG. 2 shows a block diagram of waveform display generator 3. A microprocessor 20 includes a waveform generator program 21 which compresses digital audio data into waveform display data.

Figure 13:
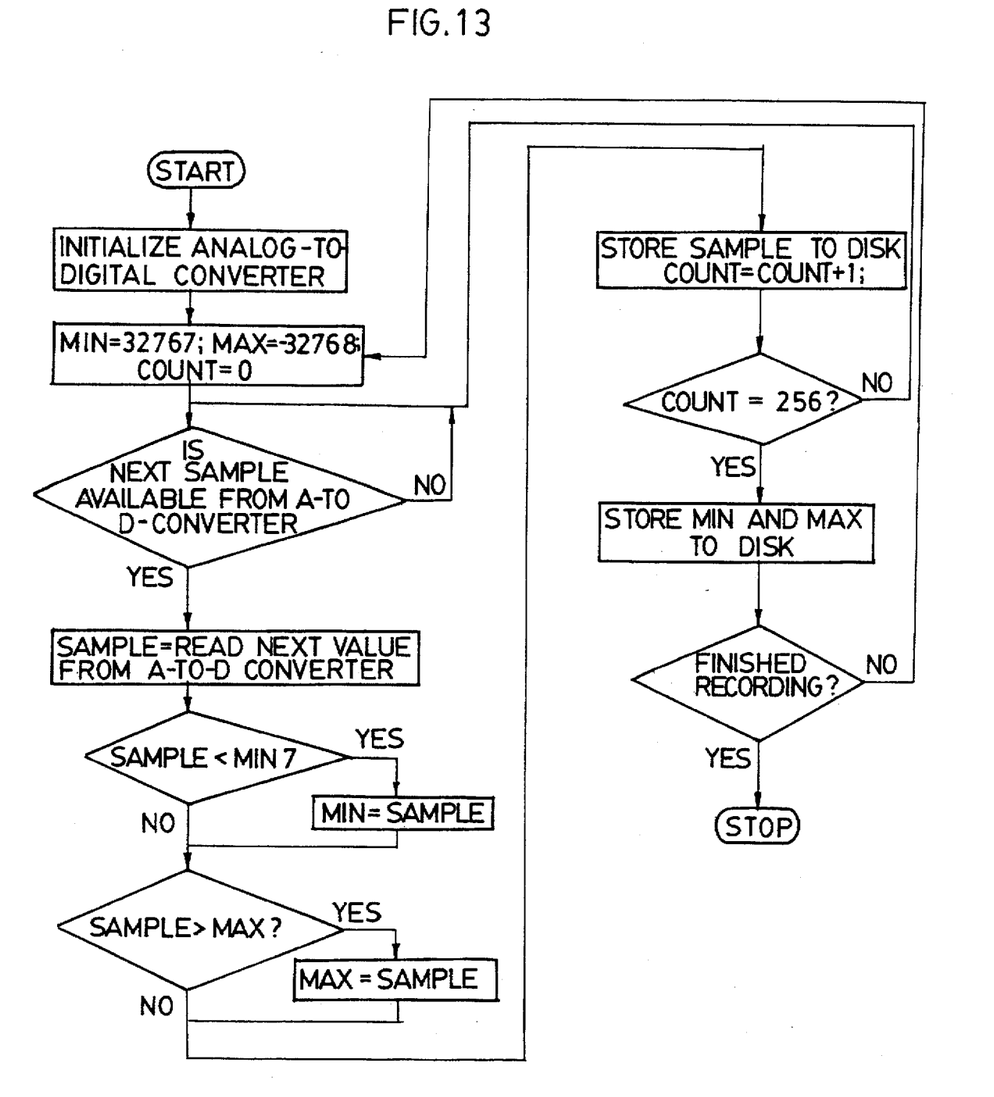
FIG. 13 is a flowchart representation of a waveform display generator method used in the preferred embodiment of the present invention.

FIG. 13 shows flowchart of a method that compresses digital audio data into waveform display data using a compression factor of 256 to 1. If several of these methods are performed by a digital processor 20 as the digital audio is being recorded into the system, then a visual presentation of the digital audio data can be created on the computer screen essentially instantaneously at any time regardless of the horizontal time scale presented in the display.

By using multiple waveform programs 21, as shown in FIGS. 2 and 13 the preferred embodiment simultaneously stores a plurality of compressed waveform displays as the digital audio is being recorded into the system. Each set of waveform display data is constructed using its own, unique scale factor according to the flowchart in FIG. 13. The scale factors used by the preferred embodiment are 1:64, 1:256, 1:1024, 1:4096 and 1:16,384.

The flowchart shown in FIG. 13 describes how a microprocessor 20 implements a method to examine a stream of digital audio data provided by an analog-to-digital converter 2. The method shown in the flowchart determines how to effectively create a visual representation of the original sound.

The flowchart determines the smallest as well as the largest numeric value that occurs in a stream of digital audio numbers. The goal is to compute the smallest value as well as the largest value that occurs in a given number of samples. For example, the waveform generator searches through 256 digital samples and computes the smallest sample as well as the largest sample that occurs in those 256 samples. If a different number of samples were processed (for example: 512 or 1024 samples), the perceived resolution of the resulting visual display would be different.

With reference to the flowchart shown in FIG. 13, the computer must first initialize the analog-to-digital converter 2 to prepare it for capturing digital audio. Such initialization typically involves setting the sampling rate and desired bit resolution for the conversion.

The waveform generator 3 initializes the variables MIN, MAX and COUNT. In the programming language "C", the computer statements might look like:

int MIN=32767;

int MAX=-32768;

int COUNT=0;

The waveform generator 3 then waits for the next digital sample to be available from the analog-to-digital converter 2. When the next converted value is available, the value is read into the variable SAMPLE.

| ConvertLoop:; | // return here for next sample |
| while (!ConverterReady0) | // wait for converter to be ready; |
| int SAMPLE = ReadConverter0; | // read one sample |

The digital processor 20 then compares the value of SAMPLE with the values of MIN and MAX. If SAMPLE is smaller than MIN, then the processor 20 copies the value of SAMPLE into MIN. Likewise, if SAMPLE is greater than MAX, the processor 20 copies the value of SAMPLE into MAX. The digital audio sample is then stored on a digital storage device 9 of some kind (for example: a hard disk drive).

| if (SAMPLE<MIN) | // compute minimum |
| MIN = SAMPLE; | |
| if (SAMPLE>MAX) | // compute maximum |
| MAX = SAMPLE; | |
| FileWriteInt(SampleFile, SAMPLE): | // store raw sample to disk |

The variable COUNT is then incremented by 1. If COUNT is less than 256, the computer branches back to analyze another converter sample.

| COUNT+=1; | //increment loop counter |
| if (COUNT<256) | //process more data until done |
| goto ConvertLoop ; | |

At the end of processing 256 samples in the way described, the variable MIN will hold the value of the smallest of the 256 samples converted and MAX will hold the value of the largest of the 256 samples converted. The values of MIN and MAX could be used to display to the user a vertical line on the computer screen 10 that is proportional to the loudness of the audio signal represented by the 256 samples that were analyzed. These values of and M and MAX are also written to disk 9, along with the audio samples, so that a visual representation of the audio can easily and quickly be constructed.

| FileWriteInt(ImageFile, MIN); | //write image data to disk |
| FileWriteInt(ImageFile, MAX); | |

II. Recalling a Visual Representation to the Screen

Figure 14:
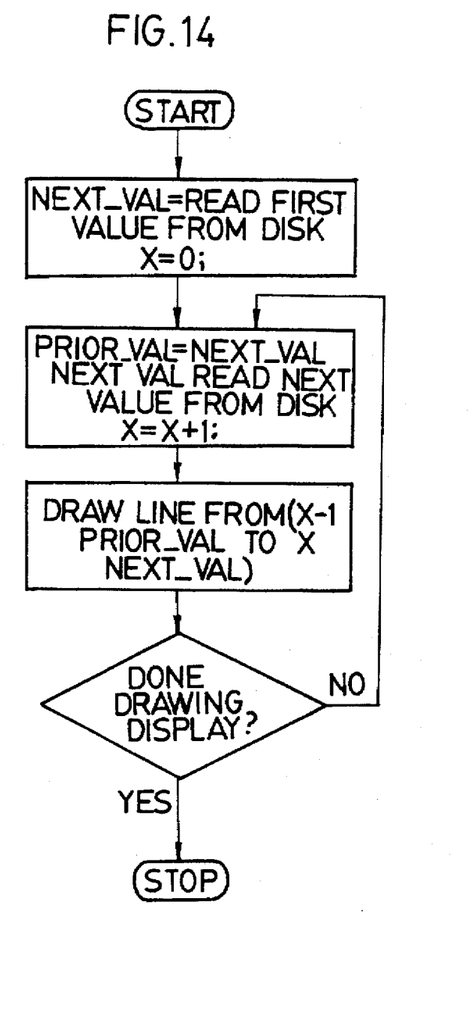
FIG. 14 is a flowchart representation of a plotting display method used in the preferred embodiment of the present invention.

There are two basic computational methods that can be used to present a visual representation of digital audio on a computer screen. The first method, called simply plotting, involves connected points on the screen with line segments. This method is particularly suitable for drawing a visual representation from the actual raw digital audio data itself. FIG. 14 presents a flowchart of this process.

1. PLOTTING DIGITAL AUDIO

The flowchart shown in FIG. 14 describes how a digital processor constructs a visual representation of the raw audio samples that were stored to disk by the Waveform Generator 3 described above.

Plotting may be thought of as being performed on a simple piece of graph paper. The horizontal, or X, axis runs from left to right. Each vertical line on the graph paper is associated with a number beginning with zero (for the left-most line on the graph paper) and incrementing by 1 for each line to the right; these lines are perpendicular to the X axis.

The Y axis runs vertically from the bottom of the graph paper to the top of the graph paper. Normally, the number 0 is associated with the horizontal line located in the middle of the graph paper (e.g., located half way between the top of the graph paper and the bottom of the graph paper). Thus, negative numbers (beginning with −1) are associated with lines below this middle line, and positive numbers (beginning with +1) are associated with lines above the middle line.

Of course, plotting is more usefully done on a computer video screen positioned in front of the user instead of on graph paper. Numerous electronic plotting methods are available and described by companies that manufacture computer screens.

The flowchart of FIG. 14 describes how the digital processor would read through the digital samples that were stored to disk 9 by the Waveform Generator 3 and construct a visual representation of these samples by plotting a series of line segments on the computer screen 10. The processor 5 would read each sample from disk 9 and plot one line segment on the screen 10 for each sample.

Plotting the raw audio samples as proposed in the Flowchart of FIG. 14 is useful for presenting very short segments of audio (one the order of one hundredth of a second or so) to the user. Presenting several seconds of recorded audio by simply plotting them is very time consuming for the computer and tedious for the user.

Plotting is simple to implement and is sufficient for short segments of digital audio. Plotting is much less useful for presenting longer segments of audio (greater than ½ second) due to the large amount of digital audio data that must be processed.

2. CONSTRUCTING A VISUAL DISPLAY FROM MINIMUM AND MAXIMUM DATA VALUES

The second method for presenting a visual representation of digital audio on a computer screen involves reading through compressed visual display data that had been generated and stored according to the Waveform Generator flowchart shown in FIG. 13. To present the Waveform, the compressed data is expanded using a preferred method for Data Expansion shown in the flowchart of FIG. 15.

Figure 15:
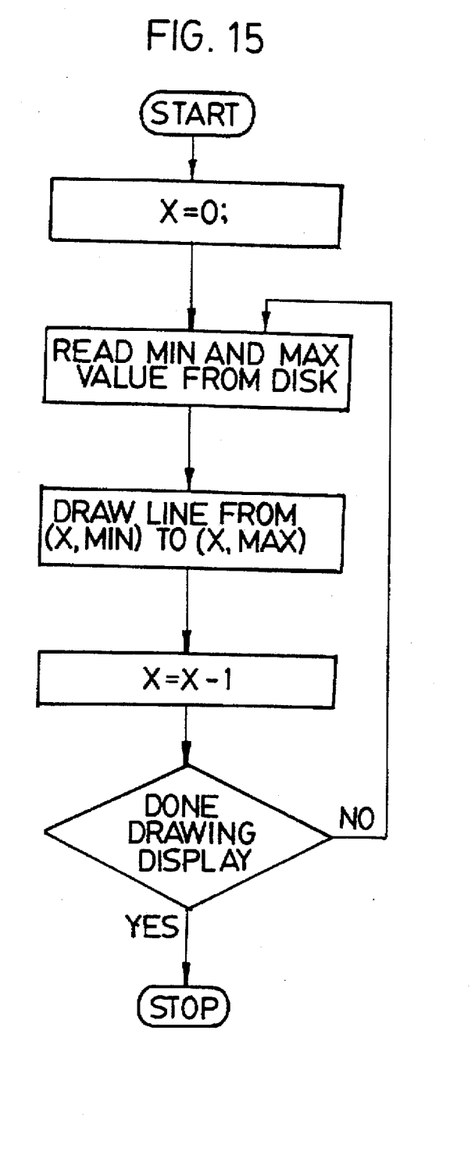
FIG. 15 is a flowchart representation of a data expansion display method used in the preferred embodiment of the present invention.

The Data Expansion flowchart presented in FIG. 15 describes a processing technique that can be used by digital processor 5 to easily and quickly construct a visual representation of a large volume of digital audio samples to the user. As the flowchart describes, the computer initializes the current plotting position (normally to X=0, which represents the left edge of the computer screen).

The computer then reads a minimum and a maximum value that had previously been computed by the Waveform Generator 3 described above. Each pair which is read consists of one minimum and one maximum value encodes the signal level of the audio over the 256 raw audio samples that were analyzed to compute the minimum and maximum values.

The computer constructs the visual representation by plotting a vertical line for each (minimum, maximum) pair. As the flowchart explains, the computer reads a (minimum, maximum) pair from the disk 9 (this pair was written to the disk 9 by the Waveform Generator 3 at an earlier time). The processor 5 then plots a single vertical line for this pair; the vertical location and length of this line are determined by the values in the pair. The processor 5 iterates until the entire display is constructed for the user.

III. Relating the Visual Presentation Back to the Original Digital Audio Data

The practical application of visual waveform presentation is to use the visual display to identify a particular region of audio and then use the computer to edit the actual digital audio data. Any point in the visual presentation can be related back to the digital audio data by using the scale factor that was used to create the visual presentation. FIG. 13 waveform generator flowchart shows a scale factor of 256 being used. The preferred embodiment uses scale factors of 1:64, 1:256, 1:1024, 1:4096 and 1:16,384. Basically, the location in the visual presentation is multiplied by the scale factor to compute a pointer to the location of the actual digital audio data.

For example, assume the user used a mouse cursor to select the region of the visual display from location 125 to location 198. If the scale factor for the visual presentation was 1:256, the selection region would correspond to samples 32,000 to 50,688 of the actual digital audio data. If, for example, the user desired to delete the selected segment of audio, the computer could delete the digital audio data from sample 32,000 to sample 50,688 using a memory-copy or disk-copy method. The desired edit would thereby be effected.

IV. File System and Operating System Requirements

The file system used to implement the preferred embodiment of the invention must be capable of storing digital audio data in large quantities at rates that exceed 100,000 bytes per second. Individual files must be byte-addressable to access the desired location.

The operating system must provide sufficient plotting capability to implement the plotting flowchart and data expansion flowchart shown above. The ability to draw line segments in a rectangular region of the screen is required. Graphical scale factors to control the size of the visual presentation would also be required.

I. The Hardware Platform

Figure 3:
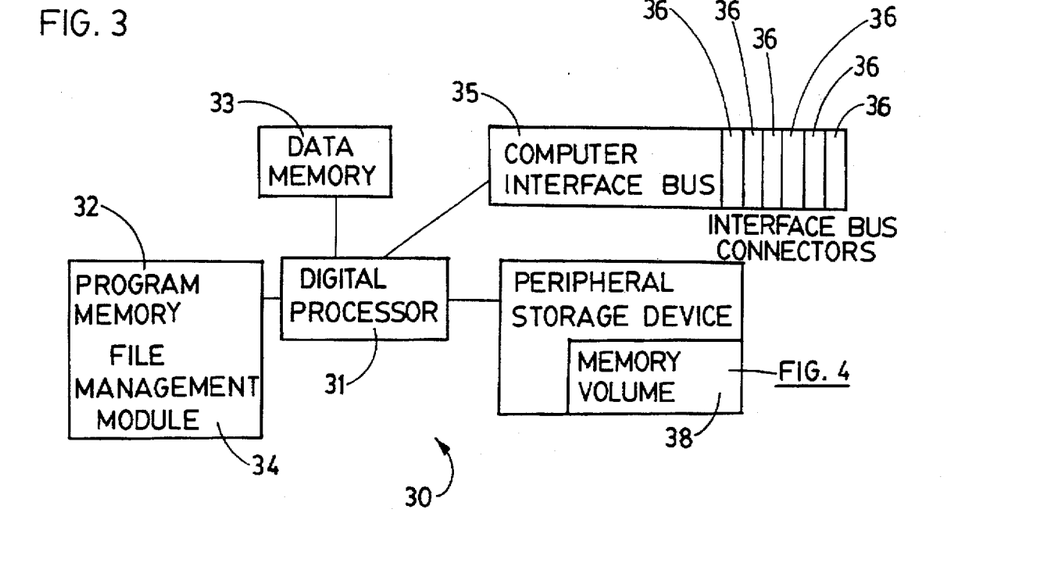
FIG. 3 is a block diagram of the hardware platform supporting the preferred file management system of the invention.

FIG. 3 illustrates a computer system 30 which allows the file management system of the preferred embodiment of the present invention to be used. The elements of computer system 30 show a further view of the processor and memory elements of FIG. 1 as they are dedicated to file management and storage. For example, digital processor 31 (FIG. 3) corresponds to digital processor 5 (FIG. 1). Data Memory 33 (FIG. 3) corresponds to data memory 6 (FIG. 1), program memory 32 (FIG. 3) corresponds to program memory 7 (FIG. 1), storage device 37 (FIG. 3) corresponds to storage device 9 (FIG. 1), and computer interface bus 35 (FIG. 3) corresponds to computer interface bus 4 (FIG. 1).

Computer system 30 includes a digital processor 31, a program memory 32 and a data memory 33. Program memory 32 contains a file management module 34 which controls the operation of digital processor 31 and instructs digital processor 31 to perform the necessary computational tasks to implement the file management and storage system of the preferred embodiment of the present invention.

FIG. 3 also shows a large capacity peripheral random access memory storage device 37 such as a commonly known magnetic or magneto-optical disk on which may be stored a large memory cache or memory volume 38.

As shown in FIG. 3, a computer interface bus 35 includes a plurality of computer interface bus connectors 36 that can be used to connect various input and output devices to digital processor 31. For example, in the field of digital audio, in addition to the Waveform generator 3 (FIG. 1) sampling apparatuses (not shown) and playback apparatuses 20 (FIG. 2) could be connected to digital processor 31 using computer interface bus 35 and computer interface bus connectors 36 to provide an easy mechanism for getting an information stream of digital audio data in and out of digital processor 31.

II. The Organization of Stored Data

The structure illustrated in FIG. 3 allows multiple input devices to each provide a stream of information. In the preferred embodiment, these multiple input devices include the plurality of Waveform generators 3 shown in FIG. 1.

The file management system of the preferred embodiment of the present invention generally uses two classes of information that are stored on a storage device 37 to organize those streams of information. "System" data is information that is used by the file management system to organize, catalog, locate, and otherwise manage the storage and retrieval of all data. "User" data is the actual data or stream of information that the File Management System stores and retrieves directly.

The preferred file management system of the present invention uses files and directory keys to manage the storage and retrieval of data. A file is a particular collection of stored user data that should be easily and quickly accessible. The user data is said to be "stored in" or "contained in" the file.

Associated with each file is a directory key that is used to access that particular file. The preferred embodiment of the file management system of the present invention uses a user-supplied file name as the directory key for each file.

The preferred file management system is particularly well suited for applications where the user data stored in a particular file consists of a plurality of related data sets as discussed below. In this context, a data set is merely a subset of the total user data that is stored in a particular file. Each data set is distinguishable in some way from other data subsets of the same file. In the preferred embodiment of the present invention each stream of information from each Waveform generator 3 connected to the interface bus connectors 36 provides one of several related data sets.

In the preferred embodiment, each of the several related sets contains similarly formatted elements of information which can be retrieved in whole or in part to provide particular details describing the stream of information in a certain style. In the preferred embodiment the style of each date set describes the visual representation of the sample digital audio data at a particular scale factor. The preferred embodiment creates several related data sets describing a single information stream to store different characteristics of the information stream. In this manner, each set of data describing a characteristic can be very quickly retrieved, and since all of the related data sets describing the different characteristics of any information stream are coincidental, the system can easily reference one characteristic from another.

The preferred embodiment of the present invention recognizes that each digital audio signal may be described in a number of different ways which all relate to each other. Those several descriptions may each be stored as a single data set to provide an entire group of related data sets.

For example, in addition to the audio or sound representation of any single audio event, that same audio event may have a graphical or display representation which is recorded as a related data set in its own format. The preferred embodiment records and accesses these related representations by storing the representations as groups of related sets of data. The description hereinafter describes two (2) groups of information and two (2) sets of related data within each group for illustrative purposes only. The preferred embodiment can be expanded to record an access an infinite number of groups of information and an infinite number of related data sets per group by applying the principles discussed herein.

The groups of related sets of data correspond to each other based upon a coincidental relationship. In the preferred embodiment, the coincidental relationship is the time of the audio event within the length of the digital audio recording or audio soundtrack.

In the preferred embodiment, even though the digitally stored visual representations are each maintained as a data set of a different style, the file management system requires that the number of data sets stored in any particular file be the same as the number of data sets stored in every other file in the system, and that the relative sizes of the data sets stored in a particular file be the same relative sizes as the data sets stored in each of the other files in the system. The preferred embodiment recognizes that the length of the recording is not known, but will be determined while the recording is taking place.

III. The File Management Structure

Figure 4:
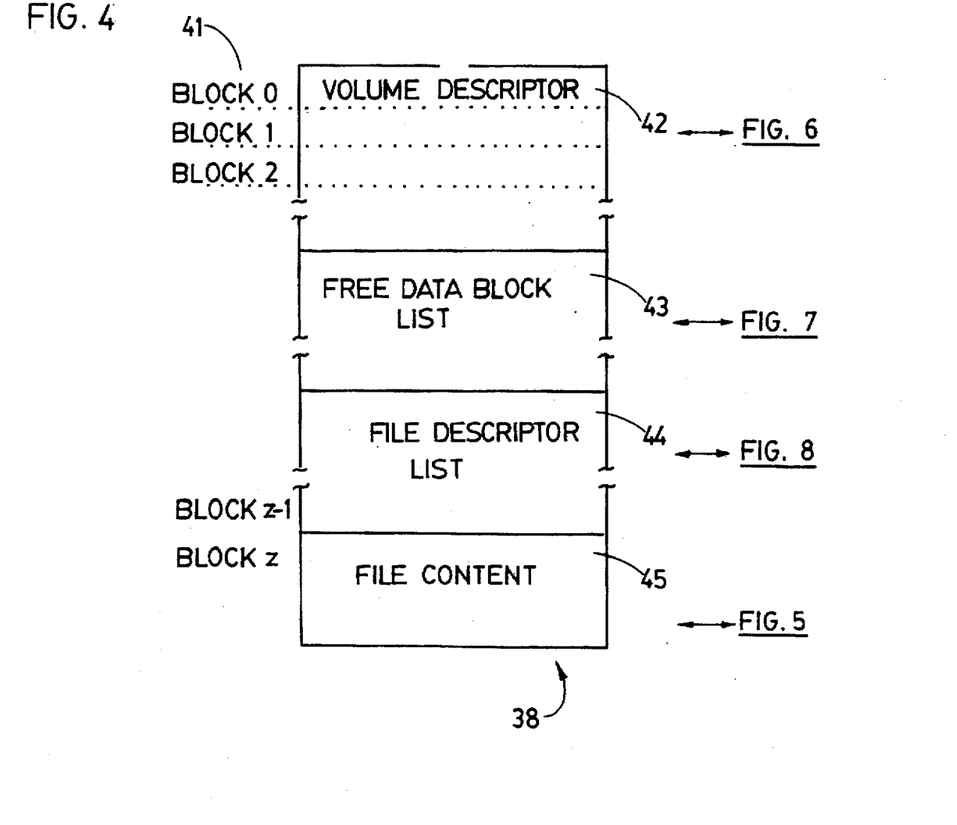
FIG. 4 is a representation of the organization of a volume allocation mapping of the storage device in a file management system of the preferred embodiment of the invention.

Referring to FIG. 4, memory volume 38 is segmented into a number of logical blocks 41. Typically, each logical block 41 is comprised of a predetermined fixed number of bytes, such as 512 bytes for the preferred embodiment. A fixed number of logical blocks starting at block 0 and ending at block X-1 are reserved for the storage of system data.

Memory volume 38 is divided into four data structure areas, including a volume descriptor area 42, a free data block list area 43, a file descriptor list area 44, and a file content area 45 in order quickly to organize, index and store data in related groups or sets which can be stored or retrieved from memory in related groups.

Figure 5:
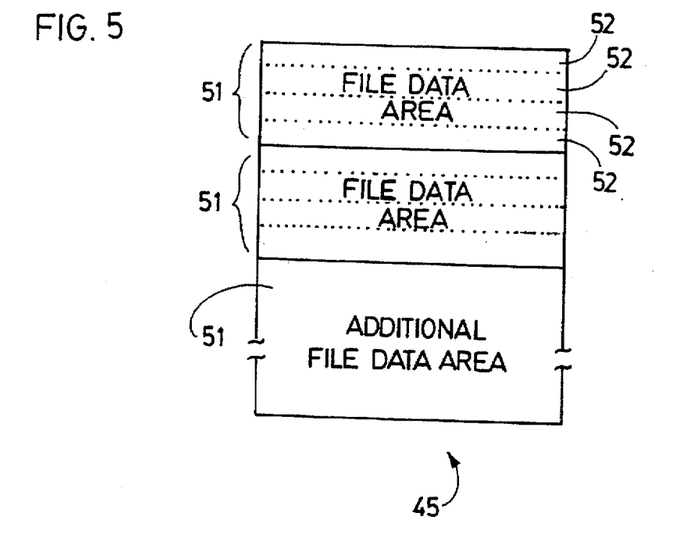
FIG. 5 is a representation of the organization of a file content area in the storage device in the preferred file management system used in the invention.

Referring to FIG. 5, file content area 45 is shown divided into a plurality of file data areas 51. Each file data area 51 represents one entire set of similarly formatted data, or one of a plurality of related data sets where each data set provides a group of information which is singularly formatted.

Each file data area 51 is further divided into a plurality of file data blocks 52. Each file data block 52 is a memory grouping which holds the smallest fractional size of information which can be stored in the file data area 51. For instance, if the related data sets include different visual waveform representations of information then a particular file data area 51 will store all of the information for any one visual representation and file data block 52 will hold information corresponding to the minimum image resolution which can be stored or displayed for that particular visual representation.

The number of file data areas 51 is chosen to be equal to the number of related data sets that will be stored and then may be accessed by a single directory key.

To allow for coincidental access from one related data set to another each file data area 51 includes the same number NUM_FDBS of file data blocks 52. Each sequential file data block 52 in any related data set is coincidentally related to all other file data blocks having an identical location in the sequence in any other related data set. The size FDB_SIZE and number NUM_FDBS of total file data blocks 52 is chosen by a formula discussed below.

Figure 8:
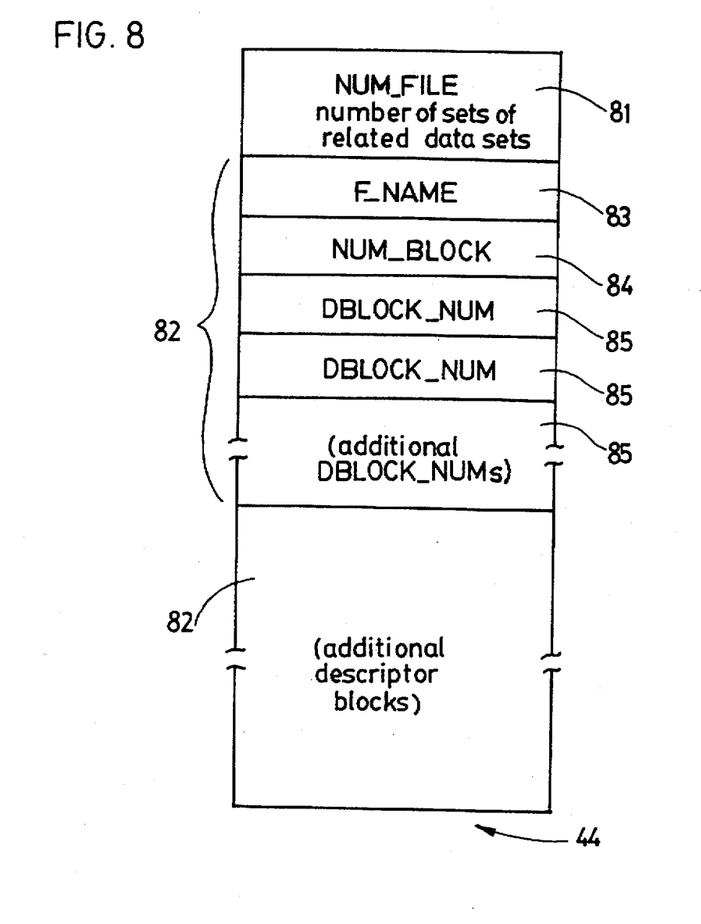
FIG. 8 is a representation of the organization of a file descriptor list data structure in the storage device in the preferred file management system of the invention.

FIG. 8 shows the structure of file descriptor list area 44 of the memory volume 38 of the preferred embodiment of the file management system of the present invention. The file descriptor list area 44 contains descriptive information about the related data sets including the number NUM_FILES 81 of sets of a group of related data sets which are stored and a plurality of file descriptor blocks 82 which each contain descriptive information about each particular set of the related data sets which are stored in segregated file data areas 51 of the file content area 45.

Within each file descriptor block 82, information is contained describing each particular set of the related data sets and allowing access thereto. F_NAME 83 contains the code name that is used to retrieve data from each particular set of the related data sets. NUM_BLOCKS 84 contains the number of file data blocks 52 that contain data for each particular set of the related data sets. A plurality of DBLOCK_NUMs 85 identify which file data blocks 52 contain the data for each particular set of the related data sets.

Figure 7:
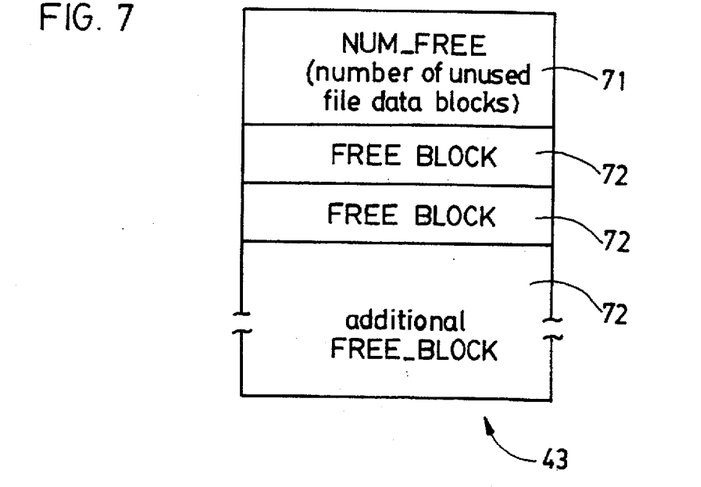
FIG. 7 is a representation of the organization of a free data block list data structure in the storage device in the preferred file management system of the invention.

FIG. 7 shows the structure of free data block list area 43 of the storage device in the preferred embodiment of the present invention. Free data block list area 43 manages the storage of new information.

Within the free data block list area 43, NUM_FREE 71 contains the number of file data blocks 52 that are not in use and thus are available for the storage of new information. A plurality of FREE_BLOCKs 72 each contain a number that uniquely identifies a particular file data block 52 that is not in use and is thus available for the storage of new information. The number 0 is associated with the first file data block 52 in each file data area 51, the number 1 is associated with the second file data block 52 in each file data area 51, and so forth.

Figure 6:
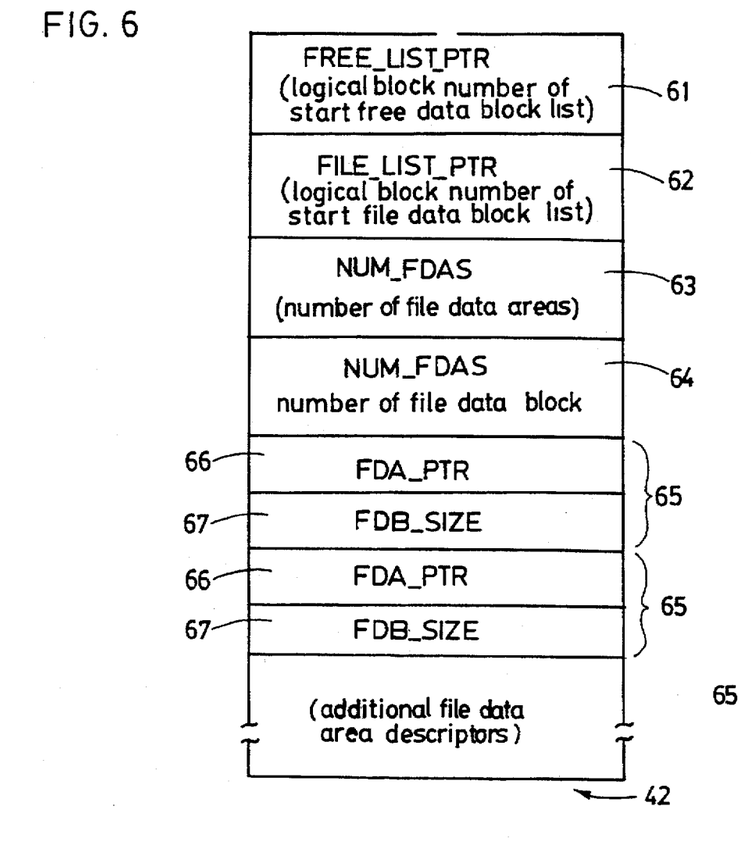
FIG. 6 is a representation of the organization of a volume descriptor data structure in the storage device in the preferred file management system used in the present invention.

FIG. 6 shows the structure of volume descriptor area 42 of the memory volume 38 of the preferred embodiment of the file management system of the present invention. The volume descriptor area 42 identifies which regions of memory volume 38 are used to store system information and which regions of memory volume 38 are used to store user information.

In volume descriptor area 42, FREE_LIST_PTR 61 contains the logical block number of the beginning of free data block list area 43 on memory volume 38. This allows the system to quickly access the available free data blocks in order to store new information.

FILE_LIST_PTR 62 contains the logical block number of the beginning of file descriptor list area 44 on memory volume 38. This allows the system to quickly access the descriptive information about the related data sets.

NUM_FDAS 63 contains the number of file data areas 51 that are included in file content area 45. NUM_FDAS 63 defines the number of sets of data in a group of related data sets.

NUM_FDBS 64 contains the number of file data blocks 52 that are included in each file data area 51. NUM_FDBS 64 defines the number of file data blocks 52 that are available for the storage of new information when memory volume 38 contains no user data.

Volume descriptor area 42 also includes a plurality of file data area descriptors 65. Each file data area descriptor 65 provides information about each file data area 51 so that the particular set of the related data sets which is stored at the file data area 51 may be accessed.

In the preferred embodiment, each file data area descriptor 65 contains a file data area pointer FDA_PTR 66 and a description of the file data block size FDB_SIZE 67. FDA_PTR 66 contains the logical block number of the beginning of the associated file data area 51. FDB_SIZE 67 contains the number of logical blocks in each file data block 52 of its associated file data area 51.

IV. General Usage of the File Management System

The file management system of the preferred embodiment of the present invention stores and retrieves information on a high capacity information storage device 37. To accomplish that end, there are several specific operations that the file management system might perform. These operations include, but are not limited to:

1. Initializing a new storage device 37 for use with the file management system;
2. Creating a file and allocating data storage space for that file;
3. Writing data to a file or reading data from a file.

Other operations that the file management system may perform, such as allocating additional storage for a file or deleting a file, will become apparent to one skilled in the art once the three basic operations listed above are described.

A. INITIALIZING A NEW STORAGE DEVICE

A storage device 37 that is to be used with the file management system of the preferred embodiment of the present invention must be "initialized" before it can be used for the storage and retrieval of data. During the initialization process, certain values are computed and stored on the device itself. These values define the sizes and locations of different regions of the storage device that will be used to store the "system" and "user" data discussed above. These values also record certain attributes of the user data that will be stored on the device, in particular the number of related data sets for which room is to be reserved, and their relative sizes. Several steps must be performed to initialize storage device 37:

1. DETERMINE STORAGE DEVICE PARAMETERS

The file management system must ascertain several parameters about the storage device itself before the storage device can be initialized. In particular, the file management system must determine the total capacity of the storage device as well as the size of the logical blocks that can be addressed thereon.

As discussed above, the size of each logical block is normally expressed in bytes, where a byte consists of 8 binary digits (for example: the number $10011011_2$). Each logical block on the storage device must contain the same number of bytes. The total capacity of the storage device is normally expressed as the number of logical blocks that can be uniquely addressed.

Storage devices 37 that conform to the well-known Small Computer System Interface standard (called the "SCSI" standard, pronounced "skuzee") can be interrogated by the file management system itself to determine these device parameters. The preferred file management system will interrogate the storage device 37 to determine the total capacity $C_t$ of the storage device 37 expressed as the number of logical blocks of length L stored thereon:

L length in bytes of each logical block available on the storage device (supplied by the manufacturer of the storage device)

$C_t$ total capacity of memory volume 38 expressed as the number of logical blocks that may be uniquely addressed thereon (supplied by the manufacturer of the storage device)

A typical large capacity storage device of recent design might have a capacity of 1,000,000 logical blocks where each logical block can store 512 bytes, yielding values of:

$C_t$=1,000,000 and

L=512

2. DETERMINE USER DATA ATTRIBUTES

The file management system must calculate and ascertain several attributes about the user data that will be stored on the storage device before the storage device can be initialized.

Specifically, the file management system must determine the number N of related data sets that are to be stored in each file, the relative size of each data set $R_1$-$R_n$, and the approximate size (in logical blocks) of the largest such data set in a "typical" or "average" file $S_{ave}$. These attributes of the user data are specified to the file management system by the user.

| | |
|---|---|
| N | number of related data sets that are stored in each file. Each of the related data sets in the file are accessed by a single directory key. |
| $R_1$-$R_n$ | relative size of each related data set 1-n. Each $R_x$ must be an integer and common multiples must be removed. |
| $S_{ave}$ | approximate size (in logical blocks) of the largest such data set in a "typical" or "average" file. |

A sample application for the file management system of the present invention might be to store 30 second digital audio recordings and associated waveshape display information on a large capacity storage device. Assuming the digital audio was recorded for thirty (30) seconds with 16-bit resolution at 44,100 samples per second requiring 2,646,000 bytes of storage which is equal to approximately 5168 logical blocks where each block stores 512 bytes, and the waveform information was compressed to a single 8-bit byte for every 256 samples of digital audio, we get:

N=2

$R_1$=512

$R_2$=1 and $S_{ave}$=5168

3. COMPUTE SPECIFIC FILE MANAGEMENT SYSTEM FACTORS USING FORMULAS

Based upon the storage device parameters and user data attributes determined in steps 1 and 2, the file management system next computes several factors that determine where on the storage device different the classes of information will be stored. These factors are chosen by the following formulas to provide for optimal and efficient data storage and retrieval. ps COMPUTE:

| | |
|---|---|
| X | sum of all relative sizes $R_1$ through $R_n$ |
| | $= R_1 + \ldots + R_n$ |
| $C_a$ | capacity available for data storage. A good value for $C_a$ is 98% of $C_t$. Smaller values of $C_a$ (such as 90% of the $C_t$) may be used to provide more room on the storage device for the storage of system data. This would be desirable if a great number of very small files were to be stored. Larger values of $C_a$ (such as 99.9% of $C_t$) may be used to provide more room for the storage of user data. |
| | $= .98 * C_t$ (approximately; other values may be used) |
| $N_a$ | approximate number of file data blocks 52 (also called extents) to use (round down to nearest whole integer value). Any number greater than or equal to 1 will allow the preferred embodiment to function, however optimal performance will be achieved by setting $N_a$ anywhere between approximately $10 * C_a \div S_{ave}$ and $100 * C_a\ S_{ave}$. If the result is zero, the storage device is too small for the intended application. |
| | $= 50 * C_{a + Save}$ (approximately; other values may be used) |
| S | $= C_a \div X \div N_a$ (round down to nearest whole integer value; substitute 1 if result is zero) |
| $S_n$ | size of file data blocks in logical blocks for each file data area |
| | $= S * R_n$ |
| $N_{fdb}$ | actual number of file data blocks 52 (also called extents) to use (round down to nearest whole integer value). |
| | $= C_a \div X \div S$ |

These calculations will yield values to be used by the system as the number of file data blocks 52 (NUM_FDBS) and the size of file data blocks 52 (FDB_SIZE), 64 and 67 respectively, used for each file data area 51. Here $N_{fdb}$=NUM_FDBS and $S_n$=FDB_SIZE.

For example, in the preferred embodiment of storing digital audio and waveforms on the storage device described in step 1:

$X = R_1 + \ldots + R_n$
$= 513$
$C_a = 0.98 * C_t$
$= 980,000$
$N_a = 50 * C_a + S_{ave}$
$= 9,481$
$S = C_a \div X \div N_a$ (round down to nearest whole integer value; substitute 1 if result is zero)
$= 1$
$S_n = S * R_n$
$S_1 = 512$
$S_2 = 1$
$N_{fdb} = C_a \div X \div S$
$= 1,910$ 4. DETERMINE LOCATION AND SIZE OF VOLUME DESCRIPTOR AREA, FREE DATA BLOCK LIST AREA, FILE DESCRIPTOR LIST AREA, AND FILE CONTENT AREA Referring to FIG. 4, Memory Volume 38 is divided into four areas: Volume Descriptor Area 42, Free Data Block List Area 43, File Descriptor List 44, and File Content Area 45.

The next step in the initialization process is to compute the size of each of these 4 areas, and determine where each area will be stored on the storage device 37.

Volume Descriptor Area 42 is used to store the Volume Descriptor as depicted in FIG. 6. In the preferred embodiment, the Volume Descriptor Area 42 begins at the very first logical block on the storage device, called Block 0. The number of logical blocks required to hold the Volume Descriptor can be readily determined by one skilled in the art and will depend on the programming language that is used, the amount of memory taken up by a single numeric quantity in that particular programming language, and the size of the logical blocks available on the storage device. The well-known programming language "C" offers a convenient "sizeof" function that can be used to perform this computation.

Free Data Block List Area 43 is used to store the Free Data Block List as depicted in FIG. 7. In the preferred embodiment, the Free Data Block List Area 43 begins at the very next logical block after the end of the Volume Descriptor Area 42. Assuming that Volume Descriptor Area 42 is stored in Block 0 and further assuming that the Volume Descriptor Area 42 will fit in a single logical block, Free Data Block List Area 43 would normally begin at Block 1. The variable FREE_LIST_PTR is set to equal this logical block number. The number of logical blocks required to hold the Free Block List can also be readily determined by one skilled in the art as described in the preceding paragraph.

File Descriptor List Area 44 is used to store the File Descriptor List as depicted in FIG. 8. In the preferred embodiment, the File Descriptor List Area 44 begins at the very next logical block after the end of Free Data Block List Area 43. Thus the logical block where File Descriptor List Area 44 is stored is easily computed by adding the number of logical blocks in Volume Descriptor Area 42 to the number of logical blocks in Free Data Block List Area 43. The result of this addition will be the logical block number where File Descriptor List Area 44 begins and is stored in the variable FILE_LIST_PTR.

When the storage device is initialized, the File Descriptor List Area 44 will be empty. It will consist of a single number (0) indicating that there are no files listed in the File Descriptor List. The content of the File Descriptor List 44 will grow as the user creates new files. To provide as much room as possible for the growth of the File Descriptor List 44, File Content Area 45 is normally chosen to begin at the logical block computed by the expression ($C_t$ minus $C_a$).

5. CONSTRUCT AND STORE THE VOLUME DESCRIPTOR

Once the locations and sizes of the 4 disk areas have been determined (step 4), a memory image of the Volume Descriptor 42 is constructed in data memory 33. This memory image is filled with the results of the computations completed in steps 2 through 4.

Referring to FIG. 6, FREE_LIST_PTR and FILE_LIST_PTR were computed directly in step 4. NUM_FDAS is equal to N as determined in step 2, NUM_FDBS is equal to $S_n$ as determined in step 3. Each file data area pointer FDA PTR is computed by totaling the prior FDB_SIZE's and adding that to the result of $C_t$ minus $C_a$.

Once the Volume Descriptor 42 is constructed in data memory 33, it is written to the storage device 37 at the logical block address determined in step 4 (normally Block 0).

6. CONSTRUCT AND STORE THE FREE DATA BLOCK LIST

Next, a memory image of the Free Data Block List 43 (FIG. 7) is constructed in data memory 33. This list may be easily constructed by one skilled in the art. NUM_FREE is equal to $N_{fdb}$ computed in step 3 above. The list of free blocks consists of the numbers 0 through $N_{fdb}-1$.

Once the Free Data Block List 43 is constructed in data memory 33, it is written to the storage device 37 at the logical block address determined in step 4 (normally Block 1).

7. CONSTRUCT AND STORE THE FILE DESCRIPTOR LIST

A memory image of the File Descriptor List 44 (FIG. 8) is then constructed in data memory 33. Since the list 44 is empty at this time (no files have been created yet), this list 44 consists of the single number 0.

Once the File Descriptor List 44 is constructed in data memory 33, it is written to the storage device 37 at the logical block address determined in step 4.

B. CREATING A NEW FILE AND ALLOCATING STORAGE FOR THAT FILE

Once the storage device 37 has been initialized, the user may then create a new file and allocate storage for that file. The File Management System performs the following steps to create a file:

1. DETERMINE THE DIRECTORY KEY AND INITIAL FILE LENGTH

The user must specify to the file management system the Directory Key that will be used to access the file after it is created. In the preferred embodiment of the present invention, the user specifies a 16 character file name as the Directory Key. The user must also specify to the file system how much storage is to be allocated to this file when it is created. Since storage can be allocated for the file at a later time, this value can be specified as zero when the file is first created.

2. READ THE VOLUME DESCRIPTOR, FREE DATA BLOCK LIST, AND THE FILE DESCRIPTOR LIST INTO MEMORY

These data structures must be read into data memory 33 from the storage device 37 so they can be accessed quickly and modified. First, the Volume Descriptor 42 is read into data memory 33 from its designated location on the storage device 37 (normally Block 0). The information in the Volume Descriptor 42 is then used to read in the Free Data Block List 43 and the File Descriptor List 44.

For example, the FREE_LIST_PTR entry of the Volume Descriptor 42 tells the File Management System where the Free Data Block List 43 is stored on the storage device 37. Likewise, the FILE_LIST_PTR entry of the Volume Descriptor 42 tells the File Management System where the File Descriptor List 44 is stored on the storage device 37 (see FIG. 6).

3. PERFORM ERROR DETECTION

Once the data structures have been read into data memory 33, the File Management System of the preferred embodiment checks for several possible error conditions. The File Descriptor List 44 is searched to see if a file already exists that uses the same directory key as the directory key that was entered by the user in step 1. An error is reported to the user if a duplicate entry is found.

Additionally, the Free Data Block List 43 is examined to make sure there is sufficient free storage available on the storage device 37 to meet the users request. The NUM_FREE entry of the Free Data Block List 43 (FIG. 7) tells the file management system how much free storage is available on the storage device 37.

4. CREATE A FILE DESCRIPTOR FOR THE NEW FILE

Provided the error checks in step 3 are completed correctly, the file management system then creates a File Descriptor (FIG. 8, item 82) for the new file. An image of the new File Descriptor 82 is created in data memory 33. The directory key specified by the user in step 1 is stored in the F_NAME field 83. The amount of storage requested to be allocated for this new file is stored in NUM_BLOCKS 84.

The DBLOCK_NUM entries of the File Descriptor List 44 are determined by removing entries from the Free Data Block List 43 and appending these entries to the new File Descriptor List 44. As each entry is removed from the end of the Free Data Block List 43 (FIG. 7), NUM_FREE is reduced by 1. The Free Data Block List 43 is managed by the commonly known first-in, last-out push-down system.

5. INCREMENT NUM FILES

Once the new File Descriptor has been created in step 4, the NUM_FILES entry 81 of the File Descriptor 83 List 44 is incremented by one to signify that one new file has been created.

6. WRITE THE MODIFIED FILE DESCRIPTOR LIST AND FREE DATA BLOCK LIST BACK OUT TO THE STORAGE DEVICE

The File Descriptor List 44 and the Free Data Block List 43 were read into data memory 33 in step 2 and were modified in steps 4 and 5. The modified File Descriptor List 44 and Free Data Block List 43 are now written back out to their respective areas of the storage device 37.

C. WRITE DATA TO A FILE OR READ DATA FROM A FILE

Once the file management system has created a file, user data may then be written to or read from any location of any data set provided for that file. The File Management System performs the following steps to access a particular file:

1. DETERMINE THE DIRECTORY KEY, DATA SET AND STARTING LOCATION

The user must specify to the File Management System the Directory Key or file name F_NAME 83 for the file which is to be accessed. Additionally, the user must specify which related data set is to be accessed (0 specifies the first data set, 1 specifies the second data set, etc.). Lastly, the user must specify where in the related data set the data is to be read from or written to. The related data set consists of file data blocks 52 which relate to each other in the preferred embodiment based upon time along an audio signal input. This time will correspond to logical block numbers where the file data blocks are stored.

2. READ THE VOLUME DESCRIPTOR AND THE FILE DESCRIPTOR LIST INTO MEMORY

The volume descriptor 42 and the file descriptor list 44 data structures are read into data memory 33 from the storage device 37 so they can be accessed quickly (see step 2 of section 4 above).

3. SEARCH THE FILE DESCRIPTOR LIST

The File Descriptor List 44 is searched for a File Descriptor whose F_NAME entry 83 matches the Directory Key specified by the user in step 1. Once the File Descriptor for the specified file is located, that File Descriptor is copied into data memory 33 and preserved so that later access to this same file can occur without again searching the File Descriptor List 44. This process is well known to someone skilled in the art and is called "caching".

4. PERFORM ERROR DETECTION

Once the correct File Descriptor is located, the file management system checks for several possible errors. Most importantly, the file management system must make sure that sufficient storage has been allocated for this file so that the data is written to or read from a section of the storage device 37 that is reserved for use by this particular file. This error detection is performed by comparing the NUM BLOCKS entry of the File Descriptor List 44 with the starting location plus the length specified by the user in step 1.

5. DETERMINE WHICH EXTENT IS TO BE WRITTEN

The file management system next determines which file data block 52 of the file must be accessed by indexing down the File Descriptor List 44 to the appropriate DBLOCK_

NUM. The starting location specified by the user in step 1 is used as an index to the list of file data blocks 52 allocated for this file. The value stored in the indexed DBLOCK_NUM identifies the logical file data block 52 which is to be accessed.

6. DETERMINE LOGICAL BLOCK ADDRESS

The file management system next determines which logical block of storage device 37 is to be accessed. This is done by multiplying the logical file data block 52 number (determined in step 5) by the FDB_SIZE entry for the related data set that is being accessed (specified by the user in step 1) (see FIG. 6). The product of this multiplication is added to the corresponding FDA_PTR. The sum identifies the logical block address of the storage device 37 that is to be accessed.

7. READ OR WRITE THE USER DATA

The user data, which in the preferred embodiment is digital audio data, specified in step 1 is written to or read from the storage device 37 at the logical block address determined in step 6.

Those skilled in the art will appreciate that various adaptations and modifications of the just described preferred embodiments can be used and configured without departing from the scope and spirit of the invention. Therefore, it is to be understood that, within the scope of the appended claims, the invention may be practiced other than as specifically described herein.

What is claimed is:

1. A system for storing a visual representation of digital audio, comprising:

a means for providing a digital audio signal;

at least one waveform display means for creating waveform display data from the digital audio signal;

a storage device for storing the waveform display data;

a digital processor; and an audio editing module means for directing the digital processor to simultaneously store a plurality of sets of audio waveform display data and the digital audio signal on the storage device, each of said plurality of sets of audio waveform display data comprising a different time scale representation of the digital audio signal, each displayed waveform corresponding to a set of audio waveform display data.

2. The system of claim 1, wherein the means for providing a digital audio signal further comprises:

a microphone for detecting sound and creating an analog signal therefrom; and an analog-to-digital converter receiving the analog signal and creating the corresponding digital audio signal.

3. The system of claim 1, wherein each waveform display means creates a different time scale representation of the digital audio signal.

4. The system of claim 1, wherein the audio editing module means further directs the digital processor to reproduce a desired soundtrack by chaining together selected segments of the stored digital audio signal.

5. The system of claim 1, wherein the audio editing module means further directs the digital processor to retrieve each set of waveform display data independently from the stored digital audio signal.

6. The system of claim 4, wherein the audio editing module means further directs the digital processor to store a revised digital audio signal by chaining together selected segments of the stored digital audio signal, the selected segments being selected from sets of displayed waveforms.

7. A system for storing and retrieving visual representations of audio, comprising:

a means for providing a digital audio signal;

a plurality of waveform display generator means for creating sets of waveform display data from the digital audio signal, each set of waveform display data corresponding one to the other and to the digital audio signal;

a storage device for storing the waveform display data;

a digital processor;

an audio editing module means for directing the digital processor to simultaneously store the plurality of sets of audio waveform display data and the digital audio signal on the storage device; and a file management system including a file management control means for establishing a plurality of data structures on the storage device, the data structures comprising geographically segregated areas for the storage of specific types of system data or user data, the user data describing the stream of information and the system data describing system organization, the segregated areas divided to arrange the provided user data into groups of related data, each of the data structures including a file content area divided into a plurality of file data areas containing a plurality of file data blocks, each file data area containing the same number of file data blocks with the file data blocks being in sequential order, such that each file data block in each file data area corresponds to all other file data blocks in an identical location in the sequential order in every other file data area, whereby the waveform display data from a digital audio signal is stored into one or more file data blocks in a file data area and the digital audio signal is stored into corresponding file data blocks in another file data area, such that information describing the digital audio signal corresponds in location to the information describing the waveform display data for facilitating accessing and utilization of the data in real time.

8. The system of claim 7, wherein the means for providing a digital audio signal further comprises:

a microphone for detecting sound and creating an analog signal therefrom; and an analog-to-digital converter receiving the analog signal and creating the corresponding digital audio signal.

9. The system of claim 7, wherein each waveform display generator creates a different time scale representation of the digital audio signal.

10. The system of claim 7, wherein the audio editing module means further directs the digital processor to reproduce a desired soundtrack by chaining together selected segments of the stored digital audio signal.

11. The system of claim 7, wherein the audio editing module means further directs the digital processor to retrieve each set of waveform display data independently from the stored digital audio signal.

12. The system of claim 7, wherein the audio editing module means further directs the digital processor to store a revised digital audio signal by chaining together selected segments of the stored digital audio signal, the selected segments being selected from the sets of waveform display data.

13. The system of claim 7, wherein the data structures include:
   (a) the file content area divided into a plurality of file data areas, each file data area containing the plurality of file data blocks, each file data block storing a single fractional piece of user data within a related set of data;
   (b) a volume descriptor structure holding system data identifying specific regions of the storage device where the system data and the user data are stored;
   (c) a free data block list structure providing a lookup table of the file data blocks currently available for storing additional user data; and
   (d) a file descriptor list structure providing an index to any of the file data blocks currently holding user data.

14. The system of claim 13 further comprising a file, the file being a group of all related data sets describing a single characteristic of the stream of information.

15. The system of claim 7, wherein the digital processor implements the instructions of the file management control means.

16. The system of claim 7, further comprising a visual display means for displaying waveform representations of the digital audio signal.

17. The system of claim 16, further comprising a means for plotting the waveform representations of the digital audio signal.

18. The system of claim 16, further comprising a means for displaying the waveform representations of the digital audio signal from the stored sets of waveform display data.

19. A method for recording audio information, comprising the steps of:
   (a) creating a digital audio signal;
   (b) creating a plurality of sets of related data, each set of data describing one of a plurality of different characteristics of the audio signal; and
   (c) simultaneously storing the plurality of related sets of data into geographically segregated file data areas upon a storage device, each piece of data within any related set of data within the plurality of related sets of data having a corresponding piece of data within each of the plurality of related sets of data, a set of related data describing a characteristic of the audio signal stored into one or more file data blocks in a file data area and a corresponding set of related data describing a different characteristic of the audio signal stored into corresponding file data blocks in another file data area, such that data describing the different characteristics of the audio signal is stored into corresponding locations on the storage device, all corresponding pieces of data describing a single audio event.

20. The system of claim 19, wherein each data set describes a different visual representation of the audio signal.

21. The method of claim 20, wherein the plurality of data sets describe a waveform display and an audio signal.

* * * * *